Feb. 25, 1947.  W. S. RENIER  2,416,348
PLASTIC MOLDING MACHINE
Filed Nov. 19, 1943  2 Sheets-Sheet 1

INVENTOR.
William S. Renier
BY
Morsell & Morsell
ATTORNEYS.

Feb. 25, 1947. W. S. RENIER 2,416,348
PLASTIC MOLDING MACHINE
Filed Nov. 19, 1943 2 Sheets-Sheet 2

INVENTOR.
William S. Renier
BY
Morsell & Morsell
ATTORNEYS.

Patented Feb. 25, 1947

2,416,348

UNITED STATES PATENT OFFICE 2,416,348

PLASTIC MOLDING MACHINE

William S. Renier, Milwaukee, Wis.

Application November 19, 1943, Serial No. 510,864

22 Claims. (Cl. 18—30)

1

This invention relates to improvements in plastic molding machines.

While the present invention is particularly adapted for use in the injection molding of thermoplastic materials, nevertheless, features of the invention are applicable to molding machines for handling plastics of a thermosetting type.

The majority of successful injection molding machines now in use are horizontally disposed, that is, the movable die plate and injection plunger travel in a horizontal direction. This has been considered necessary because these devices usually employ two hydraulic cylinders—one at one end to open and close the dies, and the other at the opposite end and working in an opposing direction to operate the injection plunger. If these machines were constructed for use in a vertical position, too much head room would be required. Vertical machines, on the other hand, are very desirable not only because they conserve floor space but also because inserts are readily maintained in position on the lower die plate by gravity, whereas in horizontal machines the holding of inserts in proper position on the dies presents a problem.

It is a general object of the present invention to provide a simple, efficient and relatively inexpensive molding machine which may be constructed for use in a vertical position without requiring an excessive amount of head room.

A further and important object of the invention is to provide a molding machine wherein the parts are constructed and arranged in a novel manner to permit a single hydraulic cylinder to effect not only the die opening and closing movement but also the movement of the injection plunger, the parts being so arranged that the movable die plate and injection plunger travel simultaneously in the same direction at a variable rate of speed with respect to each other.

A further object of the invention is to provide a construction as above described wherein the heating cylinder is mounted on the movable die plate and is movable therewith.

A more specific object of the invention is to provide a molding machine wherein the movable die plate is formed of two halves, one-half supporting the heating cylinder and the other half supporting one-half of the die, the two parts of the die plate being readily separable, if desired, to facilitate repairs or the removal of the sprue.

A still further object of the invention is to provide a molding machine which is so constructed that the stationary die plate will move a slight amount, after the dies have been completely closed, while still maintaining the necessary die closing pressure. As one method of accomplishing this function the use of springs to back up the stationary die plate is illustrated.

A further object of the invention is to provide in a single cylinder operated molding machine an improved toggle arrangement for transmitting movement from the hydraulic cylinder rod to the movable die plate, said arrangement providing for a varying rate of travel between the movable die plate and an injection plunger carried by said cylinder rod, and the arrangement providing for contact between the die halves before the cylinder rod has completed its stroke. Thus full die closing pressure is built up and maintained during the remainder of the stroke and the remainder of the stroke is utilized to inject the material into the die cavity.

With the above and other objects in view the invention consists of the improved plastic molding machine and all its parts and combinations as set forth in the claims and all equivalents thereof.

In the accompanying drawings illustrating one complete embodiment of the preferred form of the invention in which the same reference numerals designate the same parts in all of the views.

Figure 2:
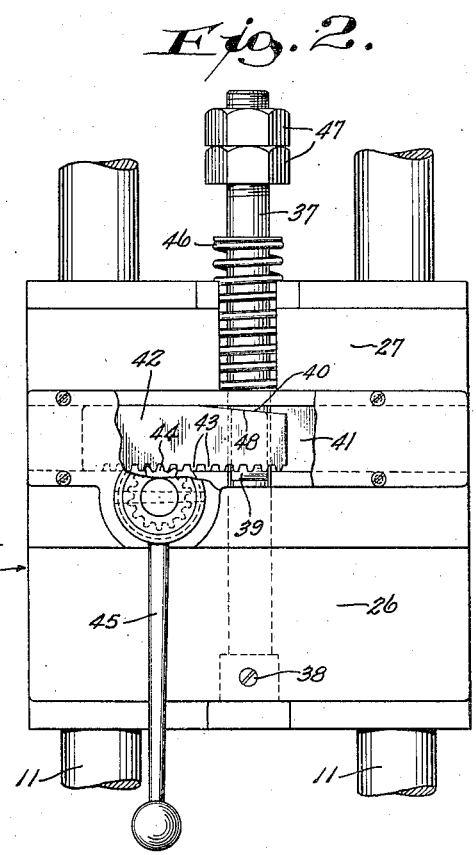
Fig. 2 is a fragmentary enlarged side elevational view, parts being broken away, illustrating the arrangement for locking the two halves of the movable die plate together.
Figure 1:
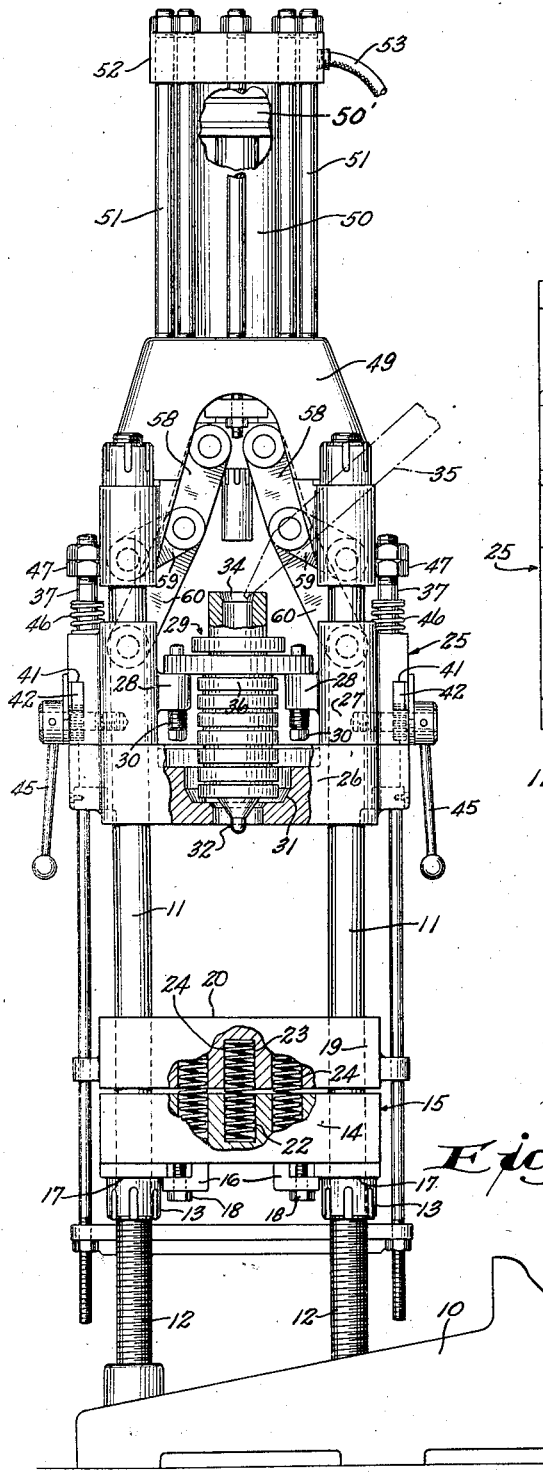
Fig. 1 is a front elevational view of the improved machine, parts being broken away and shown in section, and the feed chute being indicated by dot-and-dash lines.

Referring more particularly to the drawings the numeral 10 designates a suitable base and said base supports a plurality of upright rods 11, preferably four in number. The lower portion of each rod is threaded as at 12 to receive a nut 13. The nuts 13 may be adjusted to a desired position on the rods 12 and serve to support the lower half 14 of the stationary die plate 15, it being understood that the machine support rods 11 extend through bores in the die plate portion 14. Angle members 16 which engage beneath shoulder 17 on the nuts 13 have bolts 18 extending therethrough and threaded into the die plate portion 14 to rigidly anchor said die part to the supporting nuts 13.

Slidably mounted on the rods 11 is the upper half 19 of the stationary die plate 15. The upper surface 20 of the die plate portion 19 is adapted to support the lower half 21 of a mold.

As will hereinafter be pointed out it is important in the adaptation of the invention which has been illustrated that the mold supporting portion 19 of the stationary die plate have a slight movement after the two dies have contacted during operation of the machine. It is also important that this slight movement be permitted while maintaining the necessary die closing pressure. As one method of accomplishing this function the two halves 14 and 19 of the stationary die plate are formed with registering recesses 22 and 23 for the reception of springs 24.

Slidably mounted on the machine support rods 11 above the stationary die plate 15 is a movable die plate 25 formed of a lower half 26 and an upper half 27. The upper half has inwardly projecting lugs 28 or other suitable means for supporting a heating cylinder 29, the cylinder being removably supported on the upper ends of bolts 30. The lower half 26 of the movable die plate is formed with a vertical opening 31 of such shape as to accommodate the lower portion of the heating cylinder assembly, the nozzle 32 projecting a short distance below the lower face of the movable die plate portion 26. Thus, the nozzle is positioned to enter a short distance into the cavity of the upper half 33 (see Fig. 3) of a mold which is supported on the lower face of the movable die plate.

The heating cylinder has a feed cylinder opening 34 at its upper end into which plastic material in suitable form may be directed by a feed chute 35, the latter being automatically movable in any suitable manner into and out of feeding position during operation of the machine. From the feed cylinder opening the material is directed downwardly into the usual plasticizing cylinder portion where it is heated by heat generated in heating bands 36 surrounding the heating cylinder. The plasticized material is ultimately forced into and out of the nozzle 32 and into the die cavity.

Referring more particularly to Fig. 2, there are rods 37 which have their lower ends anchored as at 38 to the lower half 26 of the movable die. These rods project upwardly through the upper half 27, and the latter is vertically movable thereon. Each of the rods 37 is formed with a latching recess 39 which has a slanting upper edge 40. When the two halves of the die plate are together as in Fig. 2 the latching recesses register with transverse channels 41. Movable in each channel is a latch member or sliding lock 42 having its lower edge provided with rack teeth 43. A pinion 44, on each side, has its teeth in mesh with the rack 43. Each pinion is rotatable by movement of a handle 45. It is obvious that manipulation of the handle in a counter-clockwise direction will cause withdrawal of the sliding lock 42 from the latching recess 39. This will permit the lower half 26 of the die plate to fall by gravity away from the other half and this fall will be cushioned by coil springs 46 which are engageable with adjustable stop nuts 47. When the two halves of the die plate are thus separated, access may be had to the vertical opening in the lower half of the die plate to facilitate the pushing out of a sprue when this is necessary. The separation of the two halves of the movable die plate also affords ready access to the heating cylinder for repairs or adjustment. When the handle 45 is moved in a clockwise direction the sliding lock 42 is moved into the engaging position of Fig. 2. During this movement a wedging action takes place between the inclined upper edge 48 of the sliding lock and the slanting upper edge 40 of the latching recess in the rod 37.

The upper ends of the machine support rods 11 suitably support a base 49 for an hydraulic cylinder 50. Bolts 51 projecting upwardly from the base and surrounding the cylinder 50 support the cylinder head 52. Hydraulic fluid under pressure is adapted to enter the upper end of the cylinder through an inlet conduit 53 to act on a suitable piston 50' within the cylinder and cause downward movement of the cylinder rod 54 (see Fig. 3). The downwardly projecting end of the cylinder rod is equipped with a toggle link head 55, and below that with an injection plunger 56 which is movable into and out of the opening 34 of the heating cylinder unit during operation of the machine. Reverse movement of the hydraulic cylinder rod 54 is brought about by reversing the flow of the hydraulic fluid so that fluid under pressure is pumped into the lower end of the cylinder 50 through the hydraulic conduit 57.

Pivotally connected to the toggle link head 55 are the upper ends of links 58. The lower ends of the links 58 are pivotally connected to links 59 and to links 60. The links 59 are in turn pivotally connected as at 61 within slots 62 to arms 63 projecting downwardly from the base 49 of the hydraulic cylinder. The lower ends of the links 60 are pivotally connected as at 64 to the upper portion of the upper half 27 of the movable die plate 25.

Figure 3:
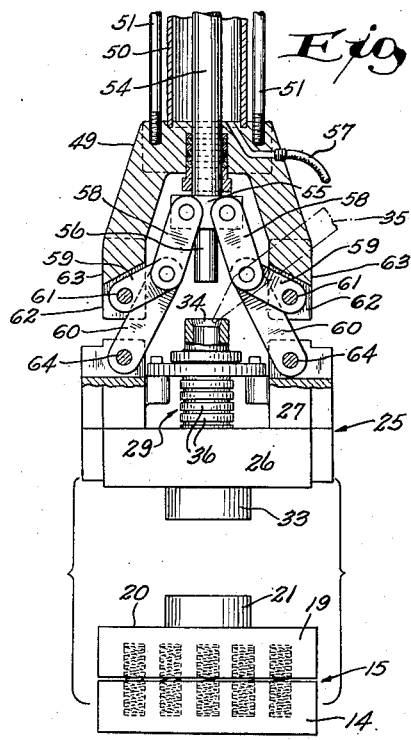
Fig. 3 is a partly diagrammatic view showing a partial vertical section and illustrating the position of the parts when the die is fully open.
Figure 4:
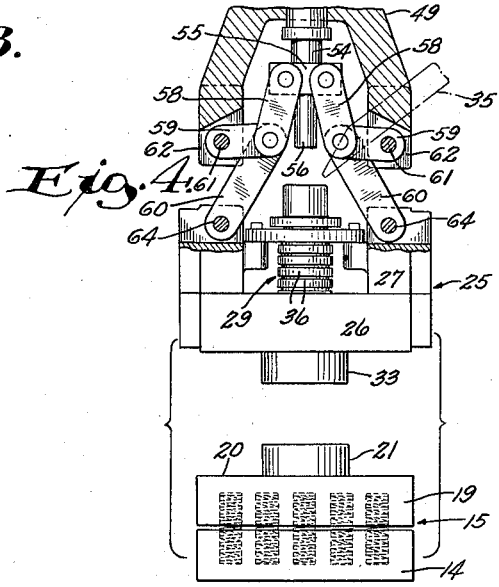
Fig. 4 is a similar view showing the position of the parts after the die closing stroke has started.

During operation of the machine, and referring first to Fig. 3, just prior to the start of the downward stroke, the feed chute 35 is in the position of Fig. 3 and automatically delivers a quantity of plastic material into the opening 34 of the heating cylinder. As the hydraulic cylinder rod 54 starts downwardly, the feed chute 35 is automatically swung to an out of the way position so as not to interfere with the ultimate entrance of the plunger 56 into the heating cylinder. When the dies are wide open, as in Fig. 3, the toggle links are in their collapsed position. As the hydraulic cylinder rod 54 moves in a downward direction the toggle links multiply the force exerted by the hydraulic cylinder and cause movement of the movable die plate toward the die closed position. As the parts move from the position of Fig. 3 to the intermediate position of Fig. 4, the rate of movement of the hydraulic cylinder rod and the movable die plate is approximately the same. As the movable die plate approaches the die closed position the rate of travel of the hydraulic cylinder rod and injection plunger 56 is much greater than the rate of travel of the movable die plate. This differential in rate of travel becomes so great that during the last part of the die closing stroke the movable die plate movement is very small. When the two halves of the die have just contacted as in Fig. 5, the parts are in the position of said figure. When in this position, however, the hydraulic cylinder rod has not as yet completed its stroke, whereas due to the toggle arrangement the dies are in contacting position. Thus, full die closing pressure is built up and maintained during the remainder of the stroke. During the remainder of the stroke, movement of the movable die plate is very slight but the injection plunger is traveling at a high rate of speed entering the heating cylinder as shown in Fig. 6 to inject the material into the die cavity. The slight amount of movement of the movable die plate during this injection movement of the plunger 56 is permitted by the springs 24 between the two halves of the stationary die plate. These springs are compressed to the position of Fig. 6, and, depending upon the strength of the springs, the die closing pressure may be limited to any desired number of tons.

Figure 5:
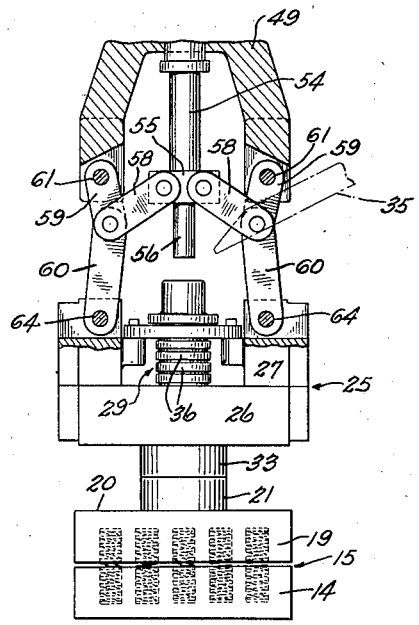
Fig. 5 is a similar view showing the position of the parts when the movable die has just contacted the stationary die.
Figure 6:
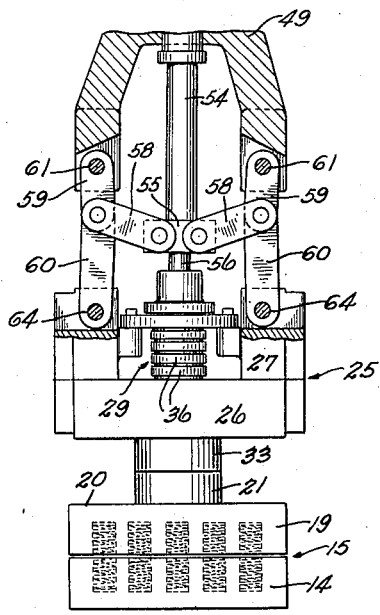
Fig. 6 is a similar view showing the position of the parts while full die closing pressure is being exerted and when the injection plunger is fully inserted in the feed cylinder.

Upon the return stroke of the hydraulic plunger a reverse action takes place and the parts are ultimately returned from the position of Fig. 6 back to the position of Fig. 5. It is to be understood that the plastic material which has been inserted in the upper end of the heating cylinder is gradually forced downwardly from the upper feed cylinder portion to the heated section where the heat causes the powdered material to become plastic. The action of the injection plunger 56 causes the newly received plastic material in powdered, granular, or pellet form to progress downwardly and at the same time causes discharge from the nozzle 32 into the die cavity of plastic material at the lower end which has been plasticized. It is to be understood that the machine includes suitable means for cooling the mold and for knocking out the molded article.

While the particular construction above described, wherein only a single hydraulic cylinder is utilized, makes it possible to build a vertical machine as illustrated, due to the fact that head room is conserved, it is, nevertheless, obvious that the principles of the present invention may be used in a horizontal machine. It is further obvious that the expense of manufacture is greatly reduced due to the use of a single cylinder for actuating the movable die plate and the injection plunger simultaneously, thus eliminating many of the parts now necessary on standard machines. While it is important in the illustrated adaptation of the invention that a slight amount of movement of the stationary die plate be permitted after the die is closed, nevertheless the problems which make this slight movement desirable may be taken care of by other means. Furthermore, other mechanism than the springs 24 may be utilized for accomplishing this purpose and for maintaining the necessary die closing pressure.

Various other changes may be made without departing from the spirit of the invention and all of such changes are contemplated as may come within the scope of the claims.

What I claim is:

1. In a machine for molding plastics or the like, a plate for supporting part of a die, a movable plate for supporting the other part of a die, a heating cylinder having a chamber for receiving plastic material and having a nozzle portion for directing plastic material in plasticized condition into said die, a cylinder having a fluid pressure operated piston therein and having a piston rod projecting from the cylinder, toggle mechanism connecting said piston rod to the movable die plate for causing opening and closing movement of the latter, and means operable by the same piston rod and movable in the same direction as the movable plate for causing discharge of plasticized material from the heating cylinder nozzle into the die after the die plates are in closed position.

2. In a machine for molding plastics or the like, a plate for supporting part of a die, a movable plate for supporting the other part of a die, a heating cylinder having a chamber for receiving plastic material and having a nozzle portion for directing plastic material in plasticized condition into said die, a cylinder having a fluid pressure operated piston therein and having a piston rod projecting from the cylinder, toggle mechanism connecting said piston rod to the movable die plate for causing opening and closing movement of the latter, and an injection plunger carried by the outer end of the same piston rod for causing discharge of plasticized material from the heating cylinder nozzle into the die after the die plates are in closed position.

3. In a machine for molding plastics or the like, a plate for supporting part of a die, a movable plate for supporting the other part of the die, a heating cylinder having a chamber for receiving plastic material supported by said movable die plate and movable therewith, said cylinder having a nozzle portion for directing plasticized material into said die, a movable injection plunger for causing discharge of said plasticized material from the nozzle, a single fluid pressure operated means for causing movement of the movable die plate toward and away from the other die plate and for causing simultaneous movement of the injection plunger in the same direction as the movable die plate, said single fluid pressure operated means including mechanism for causing the movable die plate to move at a progressively slower speed than the speed of movement of the injection plunger beginning at a time prior to contact of the two die parts.

4. In a machine for molding plastics or the the like, a plate for supporting part of a die, a movable plate for supporting the other part of the die, a heating cylinder having a chamber for receiving plastic material supported by said movable die plate and movable therewith, said cylinder having a nozzle portion for directing plasticized material into said die, a movable injection plunger for causing discharge of said plasticized material from the nozzle, a single fluid pressure operated means for causing movement of the movable die plate toward and away from the other die plate and for causing simultaneous movement of the injection plunger in the same direction as the movable die plate, and toggle mechanism connecting said fluid pressure operated means with the movable die plate for causing the latter to move at a varying speed with respect to the speed of movement of the injection plunger.

5. In a machine for molding plastics or the like, a relatively stationary die plate, a movable die plate, a heating cylinder having a chamber for receiving plastic material supported by said movable die plate and movable therewith, said cylinder having a nozzle portion for directing plasticized material into a die, a movable injection plunger for causing discharge of said plasticized material from the nozzle, a single fluid pressure operated means for causing movement of the movable die plate toward and away from the stationary die plate and for causing simultaneous movement of the injection plunger in the same direction as the movable die plate, said single fluid pressure operated means including mechanism for causing the movable die plate to move a slight distance only and at a very slow rate of speed after the dies are closed and while the injection plunger continues to move in an injecting direction at a relatively high rate of speed, and means for permitting a small amount of movement of the relatively stationary die plate after the die is closed, said last means including a mechanism for maintaining necessary die closing pressure.

6. In a machine for molding plastics or the like, a relatively stationary die plate, a movable die plate, a heating cylinder having a chamber for receiving plastic material supported by said movable die plate and movable therewith, said cylinder having a nozzle portion for directing plasticized material into a die, a movable injection plunger for causing discharge of said plasticized material from the nozzle, a single fluid pressure operated means for causing movement of the movable die plate toward and away from the stationary die plate and for causing simultaneous movement of the injection plunger in the same direction as the movable die plate, said single fluid pressure operated means including mechanism for causing the movable die plate to move a slight distance only and at a very slow rate of speed after the die is closed and while the injection plunger continues to move in an injecting direction at a relatively high rate of speed, and means including springs for permitting a small amount of spring cushioned movement of the relatively stationary die plate after the die is closed, said springs being of such strength as to maintain the necessary die closing pressure.

7. In a machine for molding plastics or the like, a plate for supporting part of a die, a movable plate for supporting the other part of the die, a heating cylinder having a chamber for receiving plastic material movable with said movable die plate, said chamber having an opening and said heating cylinder having a nozzle portion for directing plasticized material into said die, a cylinder having a fluid pressure operated piston therein and having a piston rod projecting from the cylinder, an injection plunger at the outer end of said piston rod and movable into the opening of the heating cylinder chamber to cause progressive movement of plastic material therein and discharge of plasticized material from the nozzle, and toggle mechanism connecting said piston rod to the movable die plate for causing opening and closing movement of the latter.

8. In a machine for molding plastics or the like, a relatively stationary die plate, a movable die plate, a heating cylinder having a chamber for receiving plastic material supported by said movable die plate and movable therewith, said cylinder having a nozzle portion for directing plasticized material into said die, a movable injection plunger for causing discharge of plasticized material from the nozzle, a single fluid pressure operated means for causing movement of the movable die plate toward and away from the stationary die plate and for causing simultaneous movement of the injection plunger in the same direction as the movable die plate, means including a toggle arranged to cause the movable die plate to move a slight distance only and at a slow rate of speed after the die is closed and while the injection plunger continues to move in an injecting direction at a relatively high rate of speed, and means for permitting a small amount of movement of the relatively stationary die plate after the die is closed, said last means including a mechanism for maintaining necessary die closing pressure.

9. In a machine for molding plastics or the like, a bottom die plate, a movable die plate mounted for vertical movement thereabove, a vertically disposed heating cylinder having a chamber for receiving plastic material supported by said movable die plate and movable therewith, said chamber having a top opening and said cylinder having a bottom nozzle portion for directing plasticized material into said die, a cylinder having a fluid pressure operated piston therein and having a piston rod projecting from the lower end of the cylinder, said cylinder being vertically disposed and positioned above the movable die plate, an injection plunger at the lower end of said piston rod movable into the top opening of the heating cylinder chamber to cause progressive downward movement of the plastic material therein and a discharge of plasticized material from the bottom nozzle, and toggle mechanism connecting said piston rod to the movable die plate for causing opening and closing movement of the latter.

10. In a vertically disposed machine for molding plastics or the like, a first die plate, a second two-part movable die plate positioned above said first die plate and having a lower die supporting part and having an upper part, a heating cylinder supported by said last mentioned part of the second die plate, means for releasably locking the two parts of the second die plate together to prevent downward movement of said lower part by gravity, means for limiting said downward movement when the lock is released, said heating cylinder having a chamber for receiving plastic material and being formed with an opening and said heating cylinder having a nozzle portion for directing plasticized material into a die, a cylinder having a fluid pressure operated piston therein and having a piston rod projecting from the cylinder, an injection plunger operable by said piston rod and movable into the opening of the heating cylinder chamber to cause progressive movement of the plastic material therein and discharge of plasticized material from the nozzle, and means connecting said piston rod to the upper part of the second die plate for causing opening and closing movement of the second die plate, said means preventing downward movement of said upper part when the lock is released.

11. In a vertically disposed machine for molding plastics or the like, a bottom die plate, a vertically movable die plate thereabove, said movable die plate having upper and lower parts and said lower part having an opening, a heating cylinder connected to said upper part and having a bottom discharge nozzle projecting into the opening of the bottom part, said upper and lower parts of the movable die plate being movable as a unit with the heating cylinder toward and away from the bottom die plate, a readily releasable lock for releasably securing said upper and lower die plate parts together to normally prevent downward movement of said lower die plate part by gravity, and means for yieldingly limiting the downward movement by gravity of the lower part when said lock is released.

12. In a machine for molding plastics or the like, a plate for supporting part of a die, a movable plate for supporting the other part of the die, a heating cylinder having a chamber for receiving plastic material movable with said movable die plate, said cylinder having a nozzle portion for directing plasticized material into a die, a movable injection plunger for causing discharge of plasticized material from the nozzle, a common fluid pressure operated means for causing movement of the movable die plate toward and away from the other die plate and for causing simultaneous movement of the injection plunger in the same direction as the movable die plate, and toggle mechanism connecting said fluid pressure operated means with the movable die plate for causing the latter to move at a varying speed with respect to the speed of movement of the injection plunger.

13. In a machine for molding plastics or the like, a relatively stationary die plate, a movable die plate, a heating cylinder having a chamber for receiving plastic material supported by said movable die plate and movable therewith, said cylinder having a nozzle portion for directing plasticized material into a die, a movable injection plunger for causing discharge of plasticized material from the nozzle, a common fluid pressure operated means for causing movement of the movable die plate toward and away from the stationary die plate and for causing simultaneous movement of the injection plunger in the same direction as the movable die plate, means including a toggle arranged to cause the movable die plate to move a slight distance only and at a slow rate of speed after the die is closed and while the injection plunger continues to move in an injecting direction at a relatively high rate of speed, and means for permitting a small amount of movement of the relatively stationary die plate after the die is closed, said last means including a mechanism for maintaining necessary die closing pressure.

14. In a vertically disposed machine for molding plastics or the like, a bottom die plate, a vertically movable die plate thereabove, said movable die plate having upper and lower parts, and said lower part having an opening, a heating cylinder connected to said upper part and having a bottom discharge nozzle projecting into the opening of the lower part, said upper and lower parts of the movable die plate being movable as a unit with the heating cylinder toward and away from the bottom die plate, a readily releasable lock for releasably securing said upper and lower die plate parts together to normally prevent downward movement of said lower die plate part by gravity, and means for limiting the downward movement by gravity of the lower part when said lock is released.

15. In a vertically disposed machine for molding plastics or the like, a bottom die plate, a vertically movable die plate thereabove, said movable die plate having upper and lower parts, and said lower part having an opening, a heating cylinder connected to said upper part and having a bottom discharge nozzle projecting into the opening of the lower part, said upper and lower parts of the movable die plate being movable as a unit with the heating cylinder toward and away from the bottom die plate, a readily releasable lock for releasably securing said upper and lower die plate parts together to normally prevent downward movement of said lower die plate part by gravity, means for holding the upper die plate part against downward movement by gravity when the lock is released, and means for limiting the downward movement by gravity of the lower part when said lock is released.

16. In a machine for molding plastics or other moldable material, a supporting frame, a first plate carried by said frame for supporting part of a die, a second plate movably carried by said frame for supporting the other part of the die, spaced toggle joints each having one end pivotally connected to the frame and each having its other end pivotally connected to the movable die plate, a movable toggle head, a heating cylinder carried by said movable die plate and having a chamber for receiving plastic material and having a nozzle portion for directing plastic material in plasticized condition into the die, an injection plunger movable with said toggle head, a connecting link pivoted at one end to one side of said head and at its other end to the knee of the toggle joint on one side, a second connecting link pivoted at one end to the other side of said toggle head and at its other end to the knee of the other toggle joint, and fluid pressure operated means for causing movement of said toggle head to cause movement of the movable die plate toward and away from the first mentioned die plate and to cause simultaneous movement of the injection plunger in the same direction as the movable die plate.

17. In a machine for molding plastics or other moldable material, a supporting frame, a first plate carried by said frame for supporting part of a die, a second plate movably carried by said frame for supporting the other part of the die, spaced toggle joints each having one end pivotally connected to the frame and each having its other end pivotally connected to the movable die plate, a movable toggle head, a heating cylinder carried by said movable die plate and having a chamber for receiving plastic material and having a nozzle portion for directing plastic material in plasticized condition into the die, an injection plunger movable with said toggle head, a connecting link pivoted at one end to one side of said head and at its other end to the knee of the toggle joint on one side, a second connecting link pivoted at one end to the other side of said toggle head and at its other end to the knee of the other toggle joint, and a cylinder carried by the frame and having a piston rod projecting from the cylinder and connected to said toggle head to cause movement of the movable die plate toward and away from the first-mentioned die plate, and simultaneous movement of the injection plunger in same direction as the movable die plate.

18. In a molding machine, a plate for supporting part of a die, a movable plate for supporting the other part of the die, a cylinder having a chamber for receiving moldable material movable with said movable die plate, said cylinder having a bottom opening for directing the moldable material into a die, a movable injection plunger cooperable with the moldable material in the cylinder to cause movement thereof and discharge of the material from the discharge opening into the die, a common fluid pressure operated means for causing movement of the movable die plate toward and away from the other die plate and for causing simultaneous movement of the injection plunger in the same direction as the movable die plate, and toggle mechanism connecting said fluid pressure operated means with the movable die plate for causing the latter to move at a varying speed with respect to the speed of movement of the injection plunger.

19. In a molding machine, a plate for supporting part of a die, a movable plate for supporting the other part of the die, a cylinder having a chamber for receiving moldable material movable with said movable die plate, said cylinder having a bottom opening for directing the moldable material into a die, a movable injection plunger cooperable with the moldable material in the cylinder to cause movement thereof and discharge of the material from the discharge opening into the die, a common fluid pressure operated means for causing movement of the movable die plate toward and away from the other die plate and for causing simultaneous movement of the injection plunger in the same direction as the movable die plate, toggle mechanism connecting said fluid pressure operated means with the movable die plate for causing the latter to move at a varying speed with respect to the speed of movement of the injection plunger, and means for building up and maintaining a die closing pressure while the injection plunger is finishing its forward stroke.

20. In a machine for molding plastics or other moldable material, a supporting frame, a first plate carried by said frame for supporting part of a die, a second plate movably carried by said frame for supporting the other part of the die, spaced toggle joints each having one end pivotally connected to the frame and each having its other end pivotally connected to the movable die plate, a movable toggle head, a member movable in the same direction as said movable die plate having a chamber for receiving plastic material and having a nozzle portion for directing plastic material in plasticized condition into the die, an injection plunger movable with said toggle head, a connecting link pivoted at one end to one side of said head and at its other end to the knee of the toggle joint on one side, a second connecting link pivoted at one end to the other side of said toggle head and at its other end to the knee of the other toggle joint, and means for causing movement of said toggle head to cause movement of the movable die plate toward and away from the first-mentioned die plate and to cause simultaneous movement of the injection plunger in the same direction as the movable die plate.

21. In a molding machine, a plate for supporting part of a die, a movable plate for supporting the other part of the die, a member having a chamber for receiving moldable material movable in the same direction as said movable die plate, said member having a discharge opening for directing the moldable material into said die, a movable injection plunger for causing discharge of said moldable material from said discharge opening into said die, operating means for causing movement of the movable die plate toward and away from the other die plate and for causing simultaneous movement of the injection plunger in the same direction as the movable die plate, said operating means including toggle mechanism connecting said operating means with the movable die plate for causing the latter to move at a varying speed with respect to the speed of movement of the injection plunger.

22. In a molding machine, a plate for supporting part of a die, a movable plate for supporting the other part of the die, a member having a chamber for receiving moldable material movable in the same direction as said movable die plate, said member having a discharge opening for directing the moldable material into said die, a movable injection plunger for causing discharge of said moldable material from said discharge opening into said die, operating means for causing movement of the movable die plate toward and away from the other die plate and for causing simultaneous movement of the injection plunger in the same direction as the movable die plate, said operating means including toggle mechanism connecting said operating means with the movable die plate for causing the latter to move at a varying speed with respect to the speed of movement of the injection plunger, and means for building up and maintaining a die closing pressure while the injection plunger is finishing its forward stroke.

WILLIAM S. RENIER.

REFERENCES CITED

The following references are of record in the file of this patent:

UNITED STATES PATENTS

| Number | Name | Date |
|---|---|---|
| 2,233,354 | Thilenius | Feb. 25, 1941 |
| 2,333,601 | Tucker | Nov. 2, 1943 |
| 2,244,842 | Knowles | June 10, 1941 |
| 2,246,414 | McIntyre | June 17, 1941 |

FOREIGN PATENTS

| Number | Country | Date |
|---|---|---|
| 469,994 | Germany | Jan. 2, 1929 |